UNITED STATES PATENT OFFICE.

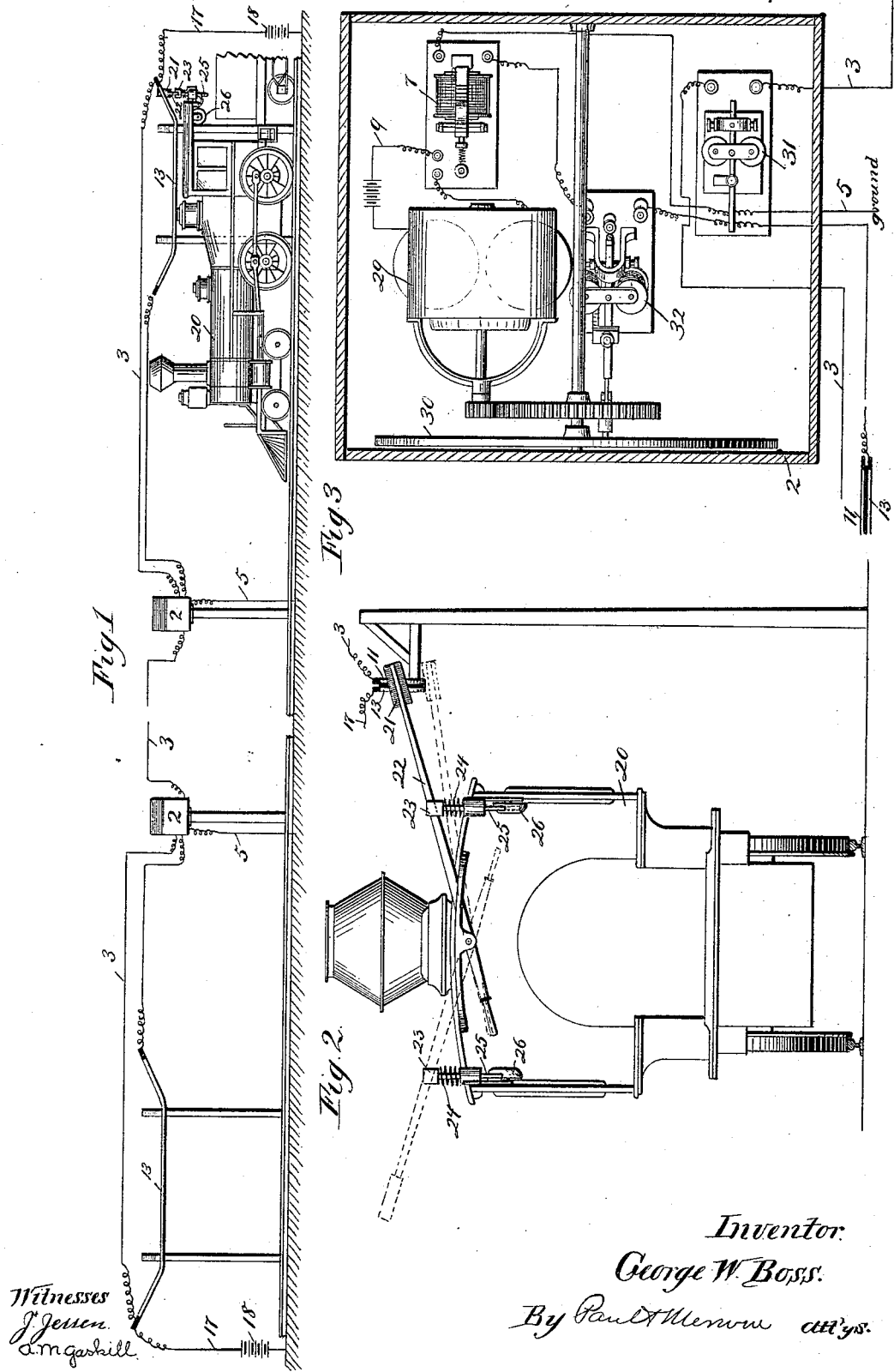

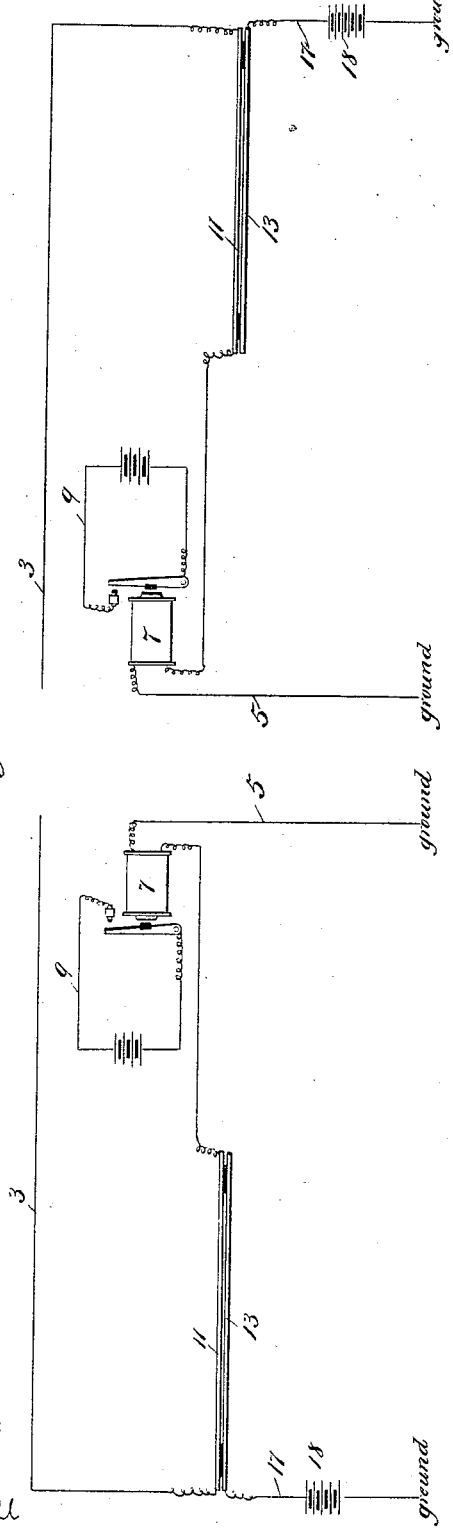

GEORGE W. BOSS, OF MINNEAPOLIS, MINNESOTA.

ELECTRIC RAILWAY-SIGNAL.

SPECIFICATION forming part of Letters Patent No. 420,859, dated February 4, 1890.

Application filed September 26, 1889. Serial No. 325,149. (No model.)

*To all whom it may concern:*

Be it known that I, GEORGE W. BOSS, of Minneapolis, in the county of Hennepin and State of Minnesota, have invented certain Improvements in Electric Railway-Signals, of which the following is a specification.

The object of this invention is to provide an improved block-signal system for railroads, in which as a train passes onto each section it will set a signal at each end of the block to indicate danger, and as it passes off from the block will set the signal at each end of the block to indicate safety, and which is adapted for use either with a single or double track, and which operates equally well whether the train is passing in one direction or the other.

Other objects of the invention will appear from the following detailed description, taken in connection with the accompanying drawings, in which—

Figure 1 is an elevation showing one block of my system arranged in connection with a railway-track, and showing an engine passing onto the block, and thus setting the signal at each end of the block to indicate danger. Fig. 2 is an end elevation of the engine with the means for closing the circuit. Fig. 3 is a horizontal section of the signal that I propose to use in connection with this system. Fig. 4 is a diagram.

In the drawings, 2 2 represent the signals, which may be of any preferred construction, and which are arranged, preferably, at each end of the block.

3 represents the main line which connects the signals. This line 3 is provided with a ground connection 5 at each end of the block. A relay or circuit-closer 7 is also arranged in the main line at each end of the block, and this relay is arranged to close a local-circuit line, (see Fig. 3,) by which the signal mechanism is operated. A contact-strip 11 is also arranged in the main line at each end of the block, the relay or circuit-closer 7 being between the contact-strip and the ground connection. A contact-strip 13 is arranged adjacent to the contact-strip 11, but insulated therefrom so that when a suitable brush or other suitable electrical conductor is brought in contact with both of said strips 11 and 13 it will span the space between said strips and form an electrical connection between them. The strip 13 is connected to a suitable wire 17, having a ground connection and provided with a suitable battery 18, arranged between the strip 13 and said ground connection. By means of the strip 13, the wire 17, and the battery 18 a partial circuit is provided at each end of the block. When a train or engine reaches either end of the block, a circuit-closer carried by the train is brought into contact with both of the strips 11 and 13. This completes a circuit from the battery 18 through the wire 17, the strip 13, the circuit-closer, the strip 11, the portion of the wire 3 that is between the strip 11 and the ground connection at that end of the block, and as the current passes through the coils of the relay 7 the local circuit controlling the signals at that end of the block will be closed. As the coils of the relay 7 form a resistance in the circuit already described, the current will be divided and a portion of it will pass from the opposite end of the strip 11 through the main portion of the wire 3 and to the ground, through the connection 5 at the other end of the block, and as it passes through the relay 7 at the other end of the block the local circuit of the signal at that end of the block will be closed and the signal at that end of the block will be operated.

I have shown the engine 20 provided with a circuit-closer consisting of a brush 21, supported upon a lever 22, pivoted upon the cab of the locomotive and adapted to be swung to either side of the track. The lever 22 rests preferably upon a block 23, supported by a spring 24, and provided with a stem 25. A gong 26 is arranged in position to be encountered by this stem when it is depressed.

The contact-strips 11 and 13 are provided with upwardly-inclined ends, as shown in Figs. 1 and 2. When the brush 21 passes beneath these contact-strips the lever 22 is depressed and sounds the gong, by this means calling attention to the fact that the engine is entering or leaving a block.

The engineer should notice when the train enters a block that the signal at that end of the block is operated.

In Fig. 3 I have shown an electric motor 29, arranged in a local circuit 9, and connected with mechanism for turning the signal-disk 30. I have also in this figure shown a signal-releasing device 32 and a lightning-arrester 31, both arranged in the main circuit. I make no claim, however, to the mechanism of the signal shown herein, as I have claimed the same in a separate application for Letters Patent of even date herewith.

This system may also be employed for operating signals for draw-bridges, switches, and highway and railway crossings.

I claim—

1. An electric railway block-signal, comprising, in combination, a main line having a ground connection at each end, a contact-strip in said line at each end, a relay in said line at each end arranged between said contact-strips and the ground connection, a signal at each end adapted to be operated by said relay, a contact-strip arranged in proximity to said first-named contact-strip and insulated therefrom, wires connected one to each of said last-named contact-strips, each provided with a suitable battery and having a ground connection, and a brush carried by an engine or train and adapted to be simultaneously brought in contact with both of the contact-strips at either end of the block, substantially as described.

2. An electric railway block-signal comprising, in combination, a main line having a ground connection at each end, a contact-strip in said line at each end, a relay in said line at each end arranged between the contact-strip and the ground connection, a signal at each end adapted to be operated by said relay, a contact-strip arranged in proximity to said first-named contact-strip and insulated therefrom, wires connected one to each of said last-named contact-strips, each provided with a suitable battery and having a ground connection, and a suitable electric conductor adapted to be simultaneously brought in contact with both of the contact-strips at either end of the block.

3. An electric railway-signal comprising, in combination, a main line having a ground connection at each end, a contact-strip in said line at each end, a relay in said line at each end arranged between said contact-strips and the ground connection, a signal at each end of the block provided with a local circuit controlled by said relay, a contact-strip arranged in proximity to said first-named contact-strip at each end of the block and insulated therefrom, a wire connected to said last-named contact-strip provided with a suitable battery and having a ground connection, and a brush carried by an engine or train and adapted to be simultaneously brought in contact with both of the contact-strips at either end of the block, substantially as described.

4. In an electric railway-signal, the combination of a main line having ground connections at each end, signals arranged at each end of the line and adapted to be operated upon the passage of an electric current through said line, a contact-strip connected with said main line, a resistance-coil at each end of said line between the contact-strip and the ground connection, contact-strips arranged in proximity to said first-named contact-strip and insulated therefrom, a wire connected to said last-named contact-strip provided with a suitable battery and having a ground connection, and a suitable electric conductor adapted to be simultaneously brought in contact with both of said contact-strips.

5. A railway-signal system comprising, in combination, a main line provided with ground connections and contact-strips at each end, a local circuit provided with suitable signals, a local-circuit closer arranged in said main line, contact-strips arranged in proximity to said first-named contact-strips, but insulated therefrom, a wire connected to each of the last-named contact-strips provided with a suitable battery and having a ground connection, and a brush carried by an engine or train and adapted to be brought simultaneously in contact with both of the contact-strips at either end of the block, substantially as described.

In testimony whereof I have hereunto set my hand this 16th day of September, 1889.

GEORGE W. BOSS.

In presence of—
 A. C. PAUL,
 A. M. GASKILL.